(12) United States Patent
Elliott

(10) Patent No.: US 10,739,166 B2
(45) Date of Patent: Aug. 11, 2020

(54) SYSTEMS AND METHODS FOR CORRECTING NON-SINUSOIDAL SIGNALS GENERATED FROM HIGH SPEED INDUCTIVE SENSORS

(71) Applicant: KSR IP Holdings, LLC, Wilmington, DE (US)

(72) Inventor: Ryan W. Elliott, Thamesville (CA)

(73) Assignee: KSR IP Holdings, LLC, Wilmington, DE (US)

(*) Notice: Subject to any disclaimer, the term of this patent is extended or adjusted under 35 U.S.C. 154(b) by 62 days.

(21) Appl. No.: 16/116,512

(22) Filed: Aug. 29, 2018

(65) Prior Publication Data

US 2019/0063954 A1 Feb. 28, 2019

Related U.S. Application Data

(60) Provisional application No. 62/551,473, filed on Aug. 29, 2017.

(51) Int. Cl.
*G01D 5/20* (2006.01)
*H01F 27/28* (2006.01)
*H01F 17/00* (2006.01)

(52) U.S. Cl.
CPC ........... *G01D 5/204* (2013.01); *G01D 5/2073* (2013.01); *H01F 17/0006* (2013.01); *H01F 27/28* (2013.01)

(58) Field of Classification Search
CPC .... H01F 17/0006; H01F 27/28; G01D 5/2073
See application file for complete search history.

(56) References Cited

U.S. PATENT DOCUMENTS

| 6,236,199 | B1 | 5/2001 | Irle et al. |
| 8,350,630 | B2 | 1/2013 | Rofougaran et al. |
| 2004/0090800 | A1* | 5/2004 | Moisin ............... H05B 41/2822 363/17 |
| 2008/0174302 | A1* | 7/2008 | Lee ...................... G01D 5/2046 324/207.16 |
| 2009/0079422 | A1* | 3/2009 | Lee ........................ G01B 7/003 324/207.16 |

(Continued)

FOREIGN PATENT DOCUMENTS

EP 1308697 A2 5/2003

*Primary Examiner* — Alavaro E Fortich
(74) *Attorney, Agent, or Firm* — Dinsmore & Shohl LLP; Thomas Anderson; Jeremy J. Justice

(57) ABSTRACT

A high speed sensor system including coupler, a sensor, a memory module, and a processor module is provided. The sensor includes a transmitter coil adapted to be energized by a high frequency current source and at least two receiving coils. One of the receiver coils generates a sine-like function output signal and the other generates a cosine-like function output signal upon rotation of the coupler. The memory module is operable to compensate for non-sinusoidal output signals caused by the high speed sensor system and the gap between the coupler and the at least two receiving coils. The processor module is communicatively coupled to the memory module. The processor module is configured to process the non-sinusoidal output signals from both the first and second receiver coils, determine the offset error, and generate a corrected output signal representative of the rotational position of the coupler.

18 Claims, 5 Drawing Sheets

(56) References Cited

U.S. PATENT DOCUMENTS

| | | | | |
|---|---|---|---|---|
| 2011/0181302 A1* | 7/2011 | Shao | ................ | G01D 5/2225 |
| | | | | 324/654 |
| 2012/0293166 A1* | 11/2012 | Lee | ................ | G01D 5/2046 |
| | | | | 324/207.17 |
| 2014/0035564 A1* | 2/2014 | Lee | ............ | G01B 7/14 |
| | | | | 324/207.12 |

* cited by examiner

SYSTEMS AND METHODS FOR CORRECTING NON-SINUSOIDAL SIGNALS GENERATED FROM HIGH SPEED INDUCTIVE SENSORS

CROSS-REFERENCE TO RELATED APPLICATIONS

This application claims the benefit of U.S. Provisional Application No. 62/551,473, filed Aug. 29, 2017, the contents of which are included herein by reference.

TECHNICAL FIELD

The present specification generally relates to inductive sensors and, more specifically to systems for correcting errors in an output of inductive sensors.

BACKGROUND OF THE INVENTION

Inductive sensors utilize a coupler that moves over transductor coil sections to determine the position of a target associated with the coupler. The sensors produce eddy currents in the receiving coils that are proportional to the position of the connector over the coils. The eddy currents are measured to produce an analog signal that is proportional to the position of the coupler along the coils. However, there are a number of errors that must be corrected in order to provide an accurate position. The sources of error include static, dynamic and magnitude errors. In "low speed applications", the errors are typically corrected by using analog and/or digital techniques to provide an offset, to correct the analog signal from raw inputs. However, in high speed applications when a minimum amount of delay in the signal change is required, the processing should be kept in the analog domain on the low cost interface chip that connects the coils. This creates a problem correcting for the dynamic offset on the input signals that varies with the coupling and excitation voltage as well as manufacturing tolerances, dynamic air gaps, the environment, and/or the like. This problem is further complicated when the interface is pure analog.

SUMMARY

In one embodiment, a high speed sensor system includes a coupler, a sensor, a memory module, and a processor module is provided. The sensor is spaced apart from the coupler to form a gap. The sensor includes a transmitter coil adapted to be energized by a high frequency current source and at least two receiving coils generating a non-sinusoidal output signals, one of the receiver coils generates a sine-like function upon rotation of the coupler and the other of the receiver coils generates a cosine-like function upon rotation of the coupler. The memory module is operable to compensate for the non-sinusoidal output signal caused by the high speed sensor system and a variance in the gap between the coupler and the at least two receiving coils. The processor module is communicatively coupled to the memory module. The processor module is configured to process the non-sinusoidal output signal from both the first and second receiver coils. The processor module also generates a corrected output signal representative of the rotational position of the coupler.

In another embodiment, a high speed sensor system includes a coupler, a sensor, a memory module, and a processor module having an analog multiplication block. The sensor is spaced apart from the coupler to form a gap. The sensor includes a transmitter coil adapted to be energized by an excitation voltage and at least two receiving coils generating a non-sinusoidal output signals. The memory module is operable to compensate for the non-sinusoidal output signal caused by the high speed sensor system and a variance in the gap between the coupler and the at least two receiving coils. The processor module is communicatively coupled to the memory module. The processor module is configured to sample the excitation voltage as an analog value and process the non-sinusoidal output signals from both the first and second receiver coils as a raw signal constant. The processor module configured to multiply, by the analog multiplication block, the analog value and a calibration value constant to generate an analog value of a corrected output signal. The processor module directly inserts the corrected output signal into the high speed sensor system.

As such, the corrected output signal can reduce the errors due to the high speed system and variances in the air gap substantially. The system as described herein permits a dynamic correction for manufacturing tolerances, which are automatically corrected thereby eliminating build calibrate steps. Further, the dynamic correction also allows for environmental effects such as gap variation and dynamic gap changes resulting in system tolerance and vibration to be corrected. The system also permits correction to first order harmonics over the electrical cycle as well as second order harmonic errors with different gains between the two output channels to correct for magnitude differences.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION OF THE DRAWINGS

Referring generally to the figures, embodiments described herein are directed systems and methods for correcting non-sinusoidal output signals in high speed applications. The system includes a coupler, a sensor, a memory module, and a processor module. The sensor includes a transmitter coil adapted to be energized by an excitation voltage and at least two receiving coils. One of the receiving coils generates a sine function upon rotation of the coupler and the other of the receiver coils generates a cosine function upon rotation of the non-circular coupler. That is, each of the receiving coils generates a raw input voltage. The memory module contains machine readable instructions that, when executed by the processor module, correct for a plurality of offset errors in the sensor system associated with the raw signals using a correction factor without a geometric change to the coil geometry. The correction factor is a ratio associated with excitation voltage and the incoming signals, or raw input voltages.

Figure 1:
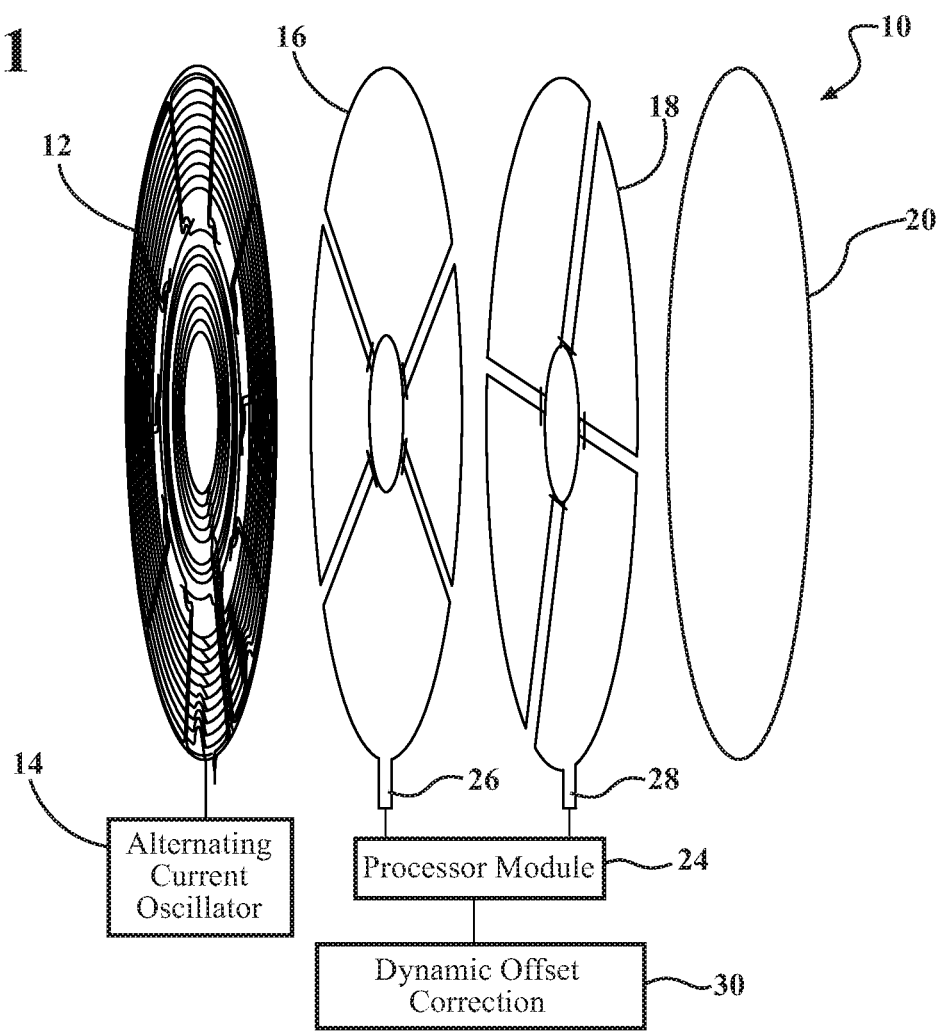
FIG. 1 schematically depicts an exploded view of an example position sensor assembly configured to correct for high speed non-sinusoidal output signals according to one or more embodiments shown and described.

Referring now to the drawings, FIG. 1 is an exploded view of an example position sensor assembly 10 configured to correct for high speed non-sinusoidal output signals according to embodiments shown and described herein is schematically depicted. As illustrated in FIG. 1, the position sensor assembly 10 includes a transmitter coil 12. The transmitter coil 12 comprises a plurality of loops of conductive material, which are coupled to a high frequency alternating current (AC) source or op amp oscillator 14, such as a 4 MHz frequency. As illustrated, the loops of the transmitter coil 12 are circular, however, the loops may be in other shapes such as oval. The transmitter coil 12 may be printed on a printed circuit board (PCB) so that, when energized by the op amp oscillator 14, the transmitter coil 12 generates a high frequency electromagnetic field. It should be appreciated that the transmitter coil 12 may be disposed on a circuit board, perfboard, stripboard, and/or the like.

The position sensor assembly 10 further includes a first receiving coil 16 and a second receiving coil 18. Both the first and second receiving coils 16, 18 are also printed on the printed circuit board and are generally aligned with the transmitter coil 12. However, it should be appreciated that each or both of the receiving coils 16, 18 need not necessary be aligned with the transmitter coil 12 and, further, that the receiving coils 16, 18 may be disposed on a circuit board, perfboard, stripboard, and/or the like.

The position sensor assembly 10 further includes a coupler element 20. As illustrated, the coupler element is concentric with both the receiving coils 16, 18 and the transmitter coil 12, however, this is for illustrative purposes and is not limiting. That is, the coupler element 20 may not necessarily be concentric with either or both of the receiving coils 16, 18 and/or the transmitter coil 12. The coupler element 20 is constructed of a conductive material so that energization of the transmitter coil 12 will create eddy currents within the coupler element 20 and thus affect the inductive coupling between the transmitter coil 12 and the first and second receiving coils 16, 18. Further, it should be appreciated that while the actual shape of the coupler element 20 is depicted as a circular shape, the shape may vary upon the application, the number of loops in the receiving coils 16, 18, the number of poles, and/or the like. For example, the coupler element 20 may have a half moon or semi-circular shape.

The coupler element 20 may mechanically be connected to a rotor, a shaft, a throttle position, and/or the like such that the rotational position of the coupler element 20 varies proportionally and the rotation of the coupler element 20 may vary the induced voltage in the loops of both the first receiving coil 16 and second receiving coil 18. Further, it should be appreciated that by the nature of being mechanically attached to the rotor, the rotor may not be machined or manufactured perfectly such that upon rotation, the rotor may not rotate the coupler at a constant air gap and/or concentric with the coils. As such, the airgap between the coupler element 20 and the receiving coils 16, 18 may be dynamic at different operating points and/or the alignment of the coupler to the receiving coils may also be dynamic at different operating points.

Still referring to FIG. 1, the position sensor assembly 10 further includes a processor module 24. The processor module 24 may be a microcontroller. As such, the processor module 24 may contain hardware for processing data, storing data, and/or correcting non-sinusoidal input signals received as output signals 26 and 28 from the receiving coils 16, 18. Thus, the processor module 24 and/or components thereof may perform one or more computing functions, such as receiving data, determining a ratio, calculating an error correction, storing the error correction, and processing the error correction, as described in greater detail herein.

As such, the processor module 24 may receive data from one or more sources, (i.e. the receiving coils 16, 18) generate data, store data, index data, search data, and/or provide data to an outside source such as an electronic control unit, another processor module, a vehicle (or components thereof), and/or the like. Moreover, the processor module 24 may be used to produce data, such as a gain value A1, a correction factor or a dynamic offset correction 30, as described in greater detail herein. It should be appreciated that the processor module 24 may function with other computing systems such as an on board vehicle computing systems, a server, a network, a user computing device such as a personal computer, and/or the like.

Figure 2A:
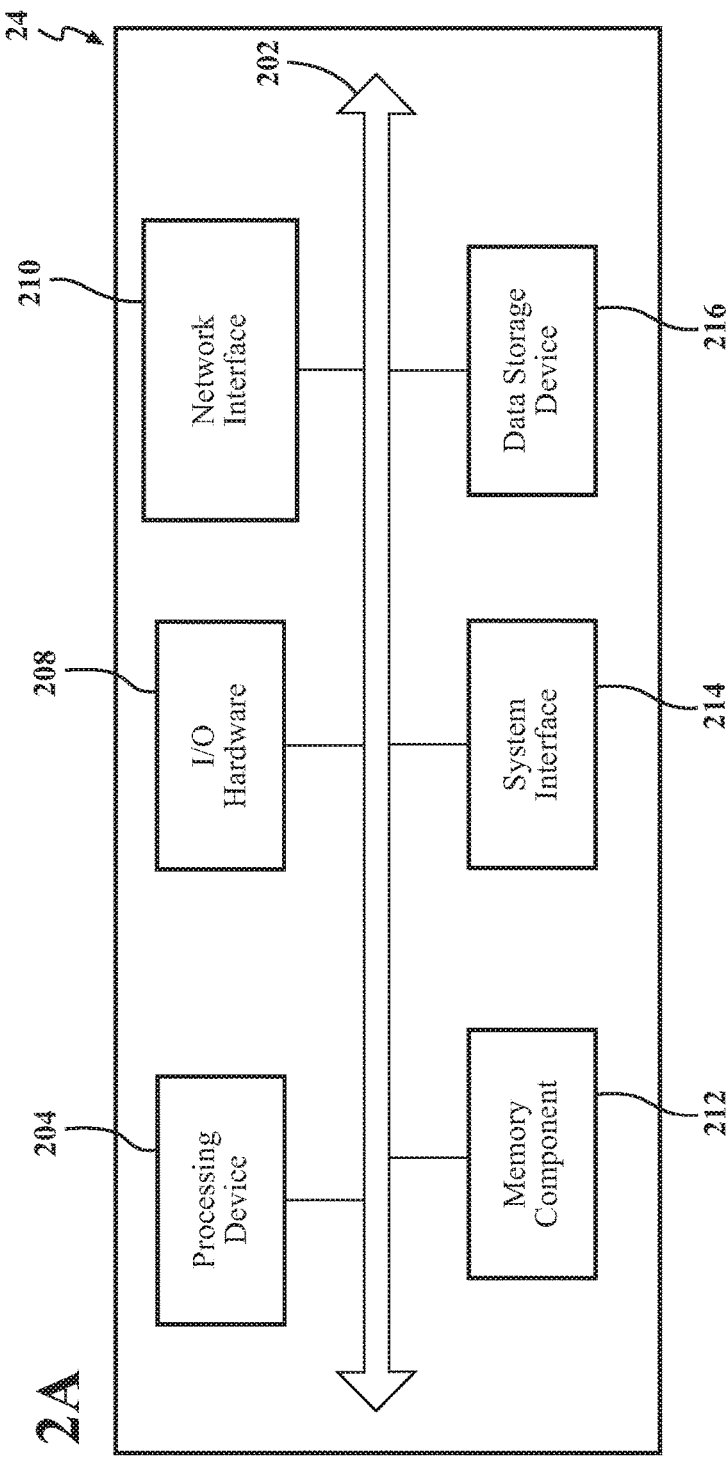
FIG. 2A schematically depicts illustrative hardware components of a processor module that may be used in correcting high speed non-sinusoidal output signals according to one or more embodiments shown and described herein.

FIG. 2A schematically depicts illustrative hardware components of the processor module 24 that may be used in correcting for non-sinusoidal input signals. The processor module 24 may be a non-transitory computer-readable medium for completing the various processes described herein, embodied as hardware, software, and/or firmware, according to embodiments shown and described herein. While in some embodiments the processor module 24 may be configured as a general purpose computer with the requisite hardware, software, and/or firmware, in other embodiments, the processor module 24 may also be configured as a special purpose computer designed specifically for performing the functionality described herein. For example, the processor module 24 may be a device that is particularly adapted to utilize mathematically calculation and look-up tables to correct for non-sinusoidal input signals. In another example, the processor module 24 may be a device that is particularly adapted to determine a gap, such as an airgap, between the coupler element 20 and the receiving coils 16, 18 and provide feedback and/or execute commands based on the gap. In embodiments where the processor module 24 is a general purpose computer, the systems and methods described herein provide a mechanism for improving functionality by determining the error is a non-sinusoidal input signal and correcting the error based on determining the gap between the coupler element and the receiving coils 16, 18 such that the efficiency of the position sensor assembly 10 or a received signal is not reduced thus maximizing a coil area to the amiable board area.

Still referring to FIG. 2A, the processor module 24 may include a processing device 204, an I/O hardware 208, a network interface hardware 210, a non-transitory memory component 212, a system interface 214, and a data storage device 216. A local interface 202, such as a bus or the like, may interconnect the various components.

The processing device 204, such as a computer processing unit (CPU), may be the central processing unit of the processor module 24, performing calculations and logic operations to execute a program. The processing device 204, alone or in conjunction with the other components, is an illustrative processing device, computing device, processor, or combination thereof. The processing device 204 may include any processing component configured to receive and execute instructions (such as from the data storage device 216 and/or the memory component 212).

The memory component 212 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 212 may include one or more programming instructions thereon that, when executed by the processing device 204, cause the processing device 204 to complete various processes, such as the processes described herein. Still referring to FIG. 2A, the programming instructions stored on the memory component 212 may be embodied as a plurality of software logic modules, where each logic module provides programming instructions for completing one or more tasks, as described in greater detail below with respect to FIG. 2B.

The network interface hardware 210 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 210 may provide a communications link between the processor module 24 and the other components of a network such as, without limitation, a server computing device.

Still referring to FIG. 2A, the data storage device 216, which may generally be a storage medium, may contain one or more data repositories for storing data that is received and/or generated. The data storage device 216 may be any physical storage medium, including, but not limited to, a hard disk drive (HDD), memory, removable storage, and/or the like. While the data storage device 216 is depicted as a local device, it should be understood that the data storage device 216 may be a remote storage device, such as, for example, a server computing device or the like (e.g., the server computing device). Illustrative data that may be contained within the data storage device 216 is described below with respect to FIG. 2C.

Still referring to FIG. 2A, the I/O hardware 208 may communicate information between the local interface 202 and one or more other components. For example, the I/O hardware 208 may act as an interface between the processor module 24 and other components, such as an external electronic control module and/or the like. In some embodiments, the I/O hardware 208 may be utilized to transmit one or more commands to the other components.

The system interface 214 may generally provide the processor module 24 with an ability to interface with one or more external devices such as, for example, user computing devices and/or server computing devices. Communication with external devices may occur using various communication ports (not shown). An illustrative communication port may be attached to a communications network.

Figure 2B:
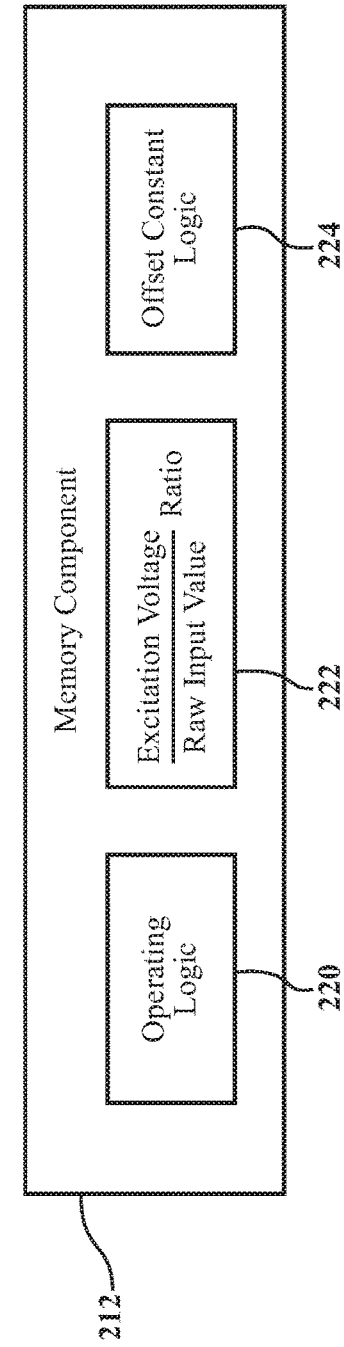
FIG. 2B schematically depicts an illustrative memory module containing illustrative logic components according to one or more embodiments shown and described herein.

With reference to FIG. 2B, in some embodiments, the program instructions contained on the memory component 212 may be embodied as a plurality of software modules, where each module provides programming instructions for completing one or more tasks. For example, FIG. 2B schematically depicts the memory component 212 containing illustrative logic components according to one or more embodiments shown and described herein. As shown in FIG. 2B, the memory component 212 may be configured to store various processing logic, such as, for example, operating logic 220, excitation voltage versus received raw signals ratio logic 222, and/or offset constant logic 224 (each of which may be embodied as a computer program, firmware, or hardware, as an example). The operating logic 220 may include an operating system and/or other software for managing components of the processor module 24 (FIG. 2A). Further, the operating logic 220 may contain one or more software modules for transmitting data, and/or analyzing data.

Still referring to FIG. 2B, the excitation voltage versus received raw signals ratio logic 222 may contain one or more software modules for determining a ratio between an excitation voltage as applied to the transmitter coil 12 and received signals by the processor module 24, as described in greater detail herein. The excitation voltage versus raw signals ratio logic 222 may be used to correct for dynamic gaps between the receiving coils 16, 18 and the coupler element 20 so to compensate for the dynamic offset errors. The offset constant logic 224 may contain one or more software modules for determining an offset constant. It should be appreciated that the offset constant may be determined externally and then added, subtracted, and/or multiplied to the ratio, such that a correction value is obtained and applied to the to the system. The constant value may correspond to a calibration value of the example position sensor assembly.

Figure 2C:
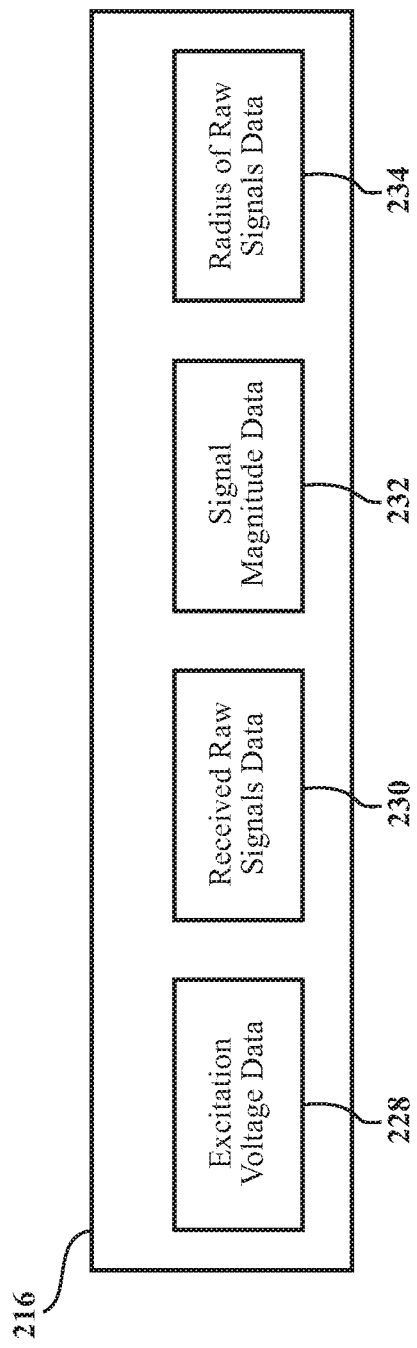
FIG. 2C schematically depicts an illustrative data storage device containing illustrative data components according to one or more embodiments shown and described herein.

FIG. 2C schematically depicts a block diagram of various data contained within a storage device (e.g., the data storage device 216). As shown in FIG. 2C, the data storage device 216 may include, for example, an excitation voltage data 228, a plurality of received raw signal data 230, a signal magnitude data 232, and/or a radius of the raw signal data 234. The plurality of excitation voltage data 228 and plurality of received raw signal data 230 may be received from the processing device 204 (FIG. 2A). The plurality of excitation voltage data 228 and the plurality of received raw signal data 230 are used as a ratio such that a proportion of the ratio value is the dynamic offset, as will be discussed in greater detail herein. As such, the processing device 204 (FIG. 2A) may be configured to transmit current excitation voltage data and current received raw signal data to the data storage device 216. The current excitation voltage data and the current received raw signal data may be captured in real time, as will be discussed in greater detail herein. The signal magnitude data 232 may be determined or monitored from the driving current or a first excitation voltage EX1. The radius of the raw signal data 234 may be determine calculating the radius of the sine-like function and the radius of the sine-like function.

It should be understood that the components illustrated in FIGS. 2A-2C are merely illustrative and are not intended to limit the scope of this disclosure. More specifically, while the components in FIGS. 2A-2C are illustrated as residing within the processor module 24, this is a non-limiting example. In some embodiments, one or more of the components may reside external to the processor module 24.

Further, it should be understood that the processor module 24 may be a steady state device, an application specific integrated circuit (ASIC) device, and/or the like. As such, these devices may have different components or the components within these devices are configured to perform the correction factor without modifying the scope of this disclosure. Further, it should be appreciated that in embodiments, the correction factor may be obtained off of the ASIC using raw values.

Figure 3:
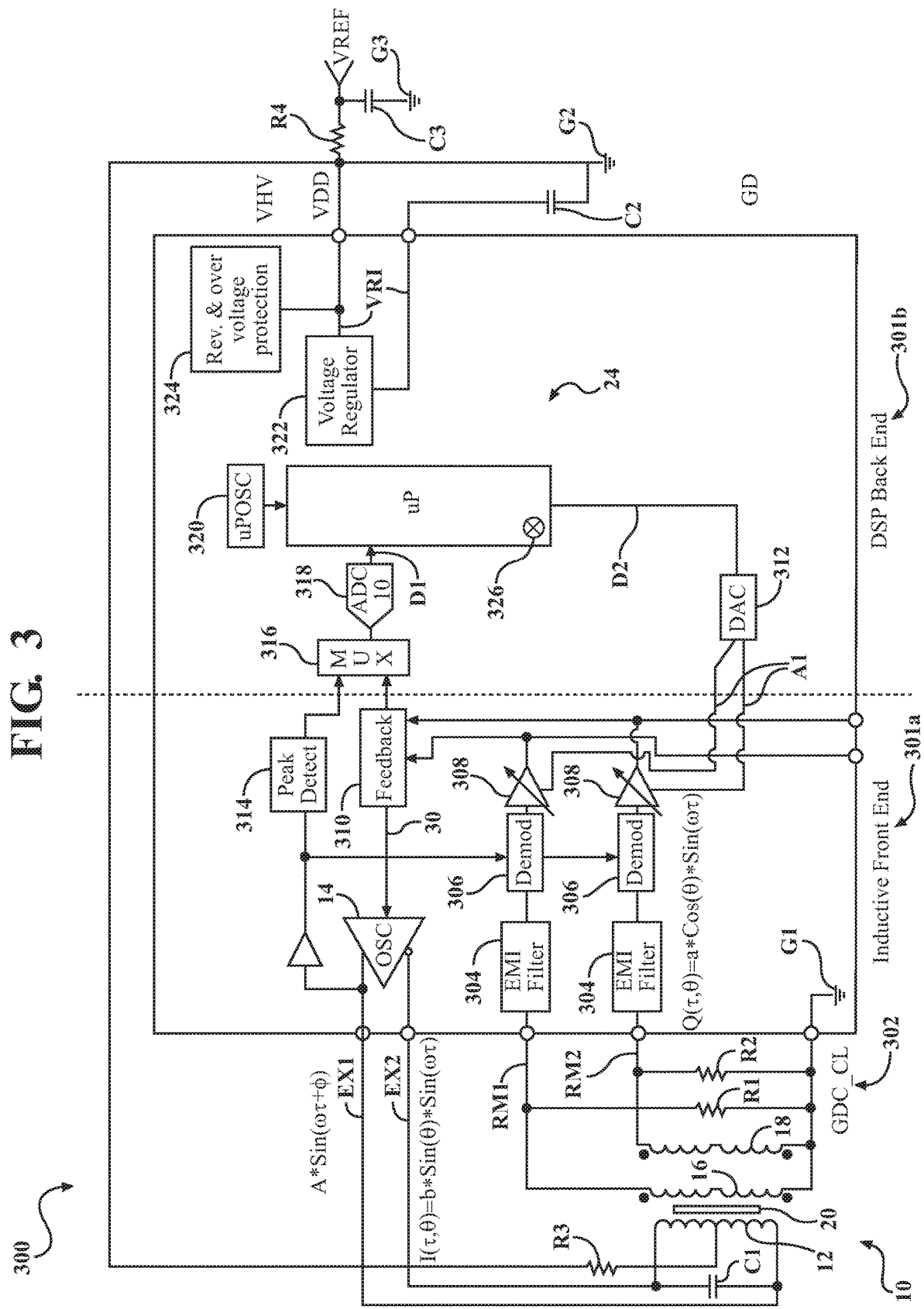
FIG. 3 schematically depicts a schematic diagram of various electronic components of the example position sensor assembly according to one or more embodiments shown and described herein.

Now referring to FIG. 3, a schematic diagram 300 of various electronic components of the example position sensor assembly 10 is schematically depicted. It should be appreciated that the sensing is performed in a front end 301a while the dynamic offset correction is determined in a back end 301b. As such, the front end 301a includes at least, as discussed above, the transmitter coil 12, the receiving coils 16, 18 and the coupler element 20. The op-amp oscillator 14 is configured to deliver a first excitation voltage EX1 and a second excitation voltage EX2 to the transmitter coil 12. Further, the first excitation voltage EX1 is electrically coupled to a peak or magnitude detector 314 configured to determine a peak or magnitude of the first excitation voltage EX1. As such, the first excitation voltage EX1 may be a reference voltage. The first excitation voltage EX1 is electrically coupled to demodulators 306, which may be configured to extract and/or recover information content from a carrier wave that may or may not be modulated. A first capacitor C1 may be electrically coupled with the transmitter coil 12 and a first resistor R1 may be electrically coupled with the transmitter coil 12 and the first capacitor C1.

The phrase "electrically coupled" is used herein to describe the interconnectivity of various components of the example position sensor assembly 10 for sensing the coupler element 20 and means that the components are connected either through wires, optical fibers, or wirelessly such that electrical, optical, and/or electromagnetic signals may be exchanged between the components. It should be understood that other means of connecting the various components of the system not specifically described herein are included without departing from the scope of the present disclosure.

A loop 302 which delivers an analog signal RM1, RM2 from the receiving coils 16, 18 through electrically coupled electromagnetic interference filters (EMI filters) 304, which are configured to remove undesirable signals such as voltages and noise. The EMI filters 304 are electrically coupled to the demodulators 306. The demodulators 306 are electrically coupled to signal conditioning amplifiers 308 to allow for a continuously or discreetly varying error signal. The signal conditioning amplifiers 308 are electrically coupled to a feedback 310 from the processor module 24. The signals RM1, RM2, originally from the receiving coils 16, 18, are feed into the feedback 310 from the signal conditioning amplifiers 308. The signal conditioners 308 may be configured to receive the gain value A1 from a digital to analog controller 312 such that the an amplification of the signal conditioners 308 may be adjusted for the feedback 310. A second and third resistor R2, R3 may be electrically coupled with the first and second receiving coils 16, 18 and/or the loop 302 may be electrically coupled to a first ground G1. As discussed above, the digital to analog converter 312 is electrically coupled to the processor module 24 to convert a digital signal D2 and to the signal conditioners 308. As such, the output signal D2 from the processor module 24 is converted at the digital to analog converter 312 into the gain value A1, which in turn is feed into the signal conditioners 308. The signal conditioners 308 output is fed into the feedback 310 such that the dynamic offset correction 30 is fed into the oscillator 14.

The feedback 310 and the peak or magnitude detector 314 are electrically coupled to a multiplexer 316 configured to select and forward the selected signal as a single output to an analog to digital converter 318. The analog to digital converter 318 then converts the analog signal into digital signals D1. The digital signals D1 are then delivered to the processor module 24. The op amp oscillator 14 receives the dynamic offset correction 30 as discussed above.

The back end 301b includes the processor module 24, the multiplexer 316, the digital to analog converter 312, and the analog to digital converter 318. The back end 301b further includes a micro primary oscillator 320 electrically coupled to the processor module 24. A voltage regulator 322 is electrically coupled to the loop 302 and electrically coupled to a drain VDD, to a fourth resister R4, a second and a third capacitor C2, C3 and a second and third ground G2, G3. Further, the back end includes a revolution and overvoltage protector 324 electrically coupled to an output VR1 of the voltage regulator 322.

The processor module 24 is configured to monitor the excitation voltage EX1 so that the processor module 24 may then determine the dynamic offset correction 30 for the excitation voltage EX1. The dynamic offset correction 30 is delivered as a dynamic or discreet signal, such as the gain A1 back to the feedback 310 and through the loop 302 to correct for the error resulting from the voltage error.

As discussed above, the processor module 24 provided monitors the raw input signals RM1, RM2 and uses an error function to determine the dynamic offset correction 30, which is introduced into the system by as the gain A1, as discussed above. The processor module 24 determines the gain A1 and transmits the gain A1 as a function of the excitation voltage data over the raw input signals value ratio data 222 (FIG. 2B) to the signal conditioning amplifiers 308 to allow for a continuously or discreetly varying error signal. As such, as discussed above, it should be appreciated that the digital to analog converter 312 may transmit the output D2 from the processor module 24 the gain A1 or a reference signal. In some embodiments, the processing and determining of the dynamic offset correction 30 may done digitally which is a speed as the space of the error function is much less than the speed of the raw input signals RM1. RM2. In other embodiments, the dynamic offset correction can be done completely as an analog feature, no "digital" required, as will be discussed in further detail below. As such, the excitation voltage EX1 may be sampled as an analog value and multiplied by the constant that then results in the analog value of the dynamic offset correction that is directly put into the system as a correction.

As discussed above, the dynamic offset correction 30 may be determined in an analog domain as opposed to digitally. In this embodiment, the dynamic offset correction 30 may be determined by using an analog multiplication block 326, which may be within the processor module 24. The excitation voltage EX1 and at least two receiving coils 16, 18 generate a non-sinusoidal output signals RM1, RM2 upon rotation of the coupler. The processor module 24 is configured to sample the excitation voltage EX1 as an analog value and process the non-sinusoidal output signals RM1, RM2 from both the first and second receiver coils 16, 18 as a raw signal constant. The processor module 24 is configured to multiply, by the analog multiplication block 326, the analog value and the calibration value to generate an analog value of the dynamic offset correction 30 or a corrected output signal. As such, the processor module 24 directly inserts the gain A2 into the signal conditional amplifiers 308 which in turn feed the feedback 310, which in turn transmits the dynamic offset correction 30 into the high-speed sensor system 10.

Figure 4A:
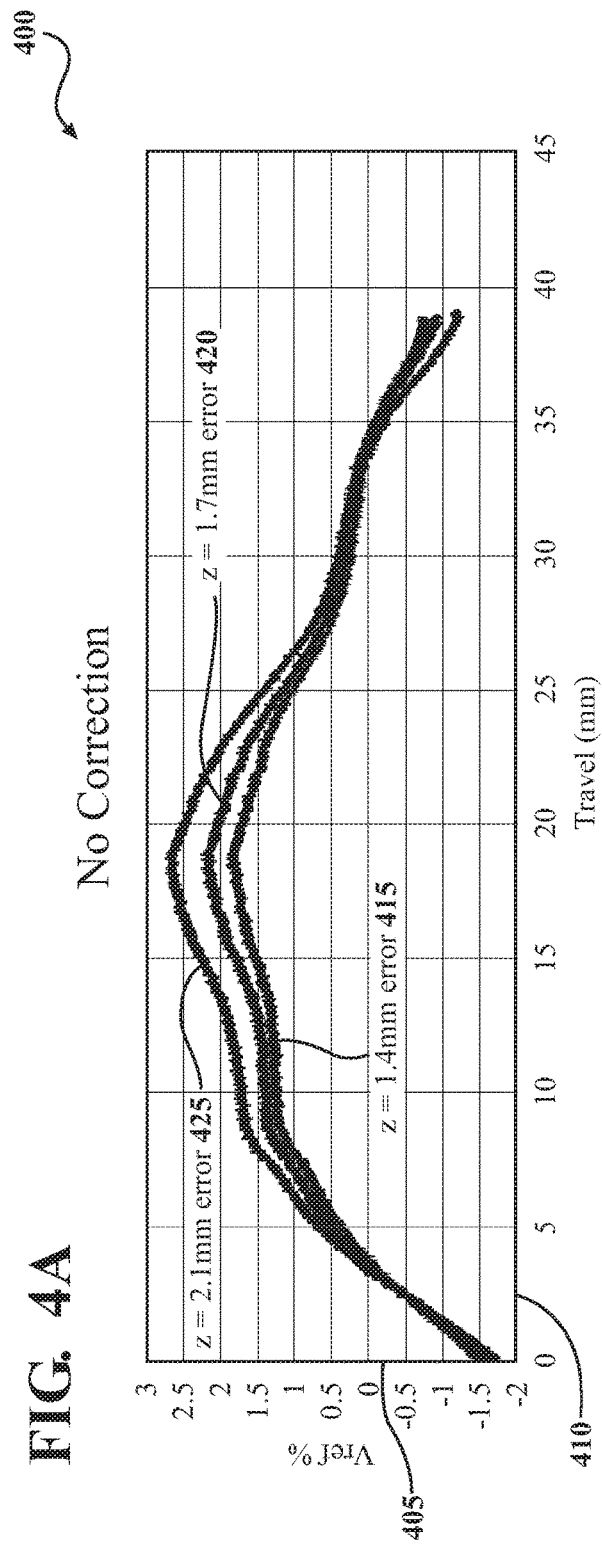
FIG. 4A schematically depicts an uncorrected high speed signal output of the example inductive sensor assembly graph according to one or more embodiments shown and described herein.
Figure 4B:
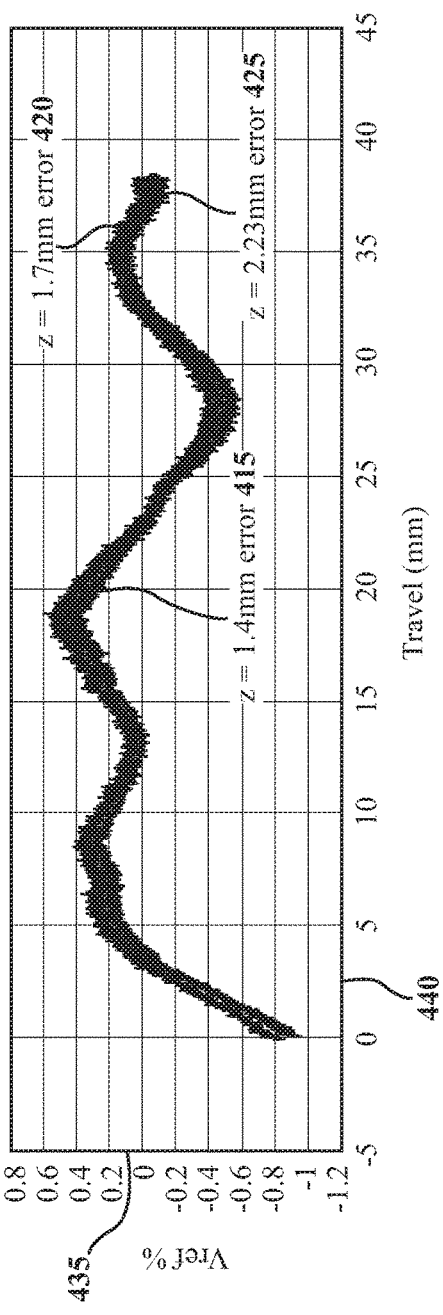
FIG. 4B schematically depicts a corrected high speed signal output of the example inductive sensor assembly graph according to one or more embodiments shown and described herein.

With reference now to FIGS. 3 and 4A-4B, the correction error changes significantly with the air gap between the coupling coils. FIG. 4A schematically depicts an uncorrected plot 400 having an ordinate 405 as a reference percentage and an abscissa 410 as a travel in millimeters (mm) described in further detail herein. The error is depicted at three different coupler air gaps, a 1.4 mm air gap 415, a 1.7 mm air gap 420, and a 2.1 mm air gap 425. The plot for all three air gaps depict a linearity sine wave. FIG. 4B schematically depicts a corrected plot 430 having an ordinate 435 as a reference percentage and an abscissa 440 as a travel in mm described in further detail herein. The error is depicted at the same three different coupler air gaps, the 1.4 mm air gap 415, the 1.7 mm air gap 420, and the 2.23 mm air gap 425 (e.g. the 2.1 mm air gap). The dynamic corrected plot illustrates the sine wave without the linearity error.

As such, it is illustrated that the dynamic correction can reduce the error substantially. It should be appreciated that the front end 301a of the position sensor assembly 10 may be analog while the back end 301b of the position sensor assembly 10 may digital as described above. It should be appreciated that the processor module 24 is able to correct dynamic errors such as first order offset errors having a single period over a full 360 degree electrical period. Dynamic correction also permits correction for manufacturing tolerances. These errors are automatically corrected thereby eliminating build calibrate steps. The dynamic correction also allows for environmental effects such as gap variation and dynamic gap changes resulting in system tolerance and vibration. The system also permits correction of second order errors with different gains between the two output channels to correct for magnitude differences.

As discussed above, the dynamic correction value may be obtained from the ratio associated with a varying excitation voltage and the incoming raw signals constant. As such, it should be appreciated that this arrangement and calculation allows for a correction based on real time data that compensates for changes occurring during an electrical cycle. The processor module 24 is configured to determine the ratio and the constant, recognize a change in the excitation voltage EX1 and then change the dynamic correction to account for the offset error and/or error in the magnitude.

It should also be appreciated that in some embodiments, the ratio may be an inverse. That is, the raw incoming signals may vary and the excitation voltages may be constant to obtain the ratio. In systems that use a constant excitation voltage the ratio of error to coil coupler air gap still varies, but the excitation voltage or current cannot be used as a correction input as discussed above. Instead, in this case, a radius of the sine/cosine system or other defined constant condition of the input signals is used as the input. The excitation voltage EX1 will remain constant however, the radius of the sine cosine will vary as the coupling factor varies. In such a situation, processing can be done completely in the analog domain desired. However, such processing has potential for further offsets that are eliminated if the signal is done in the digital domain.

It should now be understood that the dynamic offset correction disclosed herein corrects default errors associated in high-speed applications. In particular, offset errors and linearity sinusoidal errors are corrected without a coil geometric correction. As such, it should be appreciated that the system disclosed herein avoids the need for perfect coils. That is, the system disclosed herein functions regardless of the precision of the coils. Further, the system compensates for varying coils, variance in an air gap between the receiving coils and the coupler, manufacturing tolerances, metal environment inducing offsets, and/or the like. Further, the system disclosed herein corrects the error functionality such that the system continuously and/or discretely corrects for the errors associated with the high-speed system and/or variances in the gap between the coupler and the receiving coils at multiple operating points. The correction is a constant and a ratio associated with the excitation voltage and the raw signals. In some embodiments, the excitation voltage is dynamic and the raw signals are constant. In other embodiments, the excitation voltage is constant and the raw signals are dynamic. It should be appreciated that the system recognizes a change in the voltage and then applies a correction response to correct the error functionality.

Although the present invention has been described as a position sensor having a pair of receiving coils, each having receiving loops, the receiving coils can have any even number of receiving loops. For example, a first receiving coil 16 and a second receiving coil 18, each have four separate loops, six separate loops, and/or the like.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. A high speed sensor system comprising:
a coupler;
a sensor spaced apart from the coupler to form a gap, the sensor comprising a transmitter coil adapted to be energized by a high frequency current source and at least two receiving coils generating a non-sinusoidal output signals, one of the receiver coils generates a generally sine shaped function upon rotation of the coupler and the other of the receiver coils generates a generally cosine shaped function upon rotation of the coupler;
a memory module operable to compensate for the non-sinusoidal output signal caused by the high speed sensor system and a variance in the gap between the coupler and the at least two receiving coils; and
a processor module communicatively coupled to the memory module, the processor module configured to process the non-sinusoidal output signals from both the first and second receiver coils,
wherein the processor module also generates a corrected output signal representative of the rotational position of the coupler.

2. The high speed sensor system of claim 1, wherein an excitation voltage that energizes the transmitter coil is dynamic and the raw signals from the non-sinusoidal output signals from both the first and second receiver coils are constant.

3. The high speed sensor system of claim 2, wherein the processor module is configured to:
determine the excitation voltage that energizes the transmitter coil;
determine the raw signals from the non-sinusoidal output signals from both the first and second receiver coils;

compute a ratio of the excitation voltage over the raw signals;
calculate the corrected output signal based on the ratio of the excitation voltage over the raw signals; and
compensate the non-sinusoidal output signals with the corrected output signal.

4. The high speed sensor system of claim 2, wherein the excitation voltage is sampled as an analog value and multiplied by the the raw signals constant that then results in the analog value of the corrected output signal that is directly put into the high speed sensor system as a correction.

5. The high speed sensor system of claim 3, wherein the corrected output signal is proportional to the ratio of the of the excitation voltage over the raw signals.

6. The high speed sensor system of claim 3, wherein the processor module solely receives the raw signals from the non-sinusoidal output signals from both the first and second receiver coils.

7. The high speed sensor system of claim 1, wherein the sensor is an analog signal and the processor is a digital signal.

8. The high speed sensor system of claim 1, wherein the non-sinusoidal output signals is a first order harmonic error having a single period over a full 360 degree electrical period.

9. The high speed sensor system of claim 1, wherein the non-sinusoidal output signal is a second order harmonic error.

10. The high speed sensor system of claim 1, wherein the gap is an airgap.

11. The high speed sensor system of claim 10, wherein the raw signals from the non-sinusoidal output signals from both the first and second receiver coils vary with the airgap.

12. The high speed sensor system of claim 1, wherein the excitation voltage that energizes the transmitter coil is constant and the raw signals from the non-sinusoidal output signals from both the first and second receiver coils are dynamic.

13. The high speed sensor system of claim 12, wherein the processor module is configured to:
determine the excitation voltage that energizes the transmitter coil;
determine a radius of the generally sine like function;
compute a ratio of the excitation voltage over the radius;
calculate the corrected output signal based on the ratio of the excitation voltage over the radius; and
compensate the non-sinusoidal output signals with the corrected output signal.

14. The high speed sensor system of claim 12, wherein the sensor is an analog signal processor module is in an analog domain.

15. The high speed sensor system of claim 13, wherein the raw signals from the non-sinusoidal output signals from both the first and second receiver coils are only known by the processor module.

16. The high speed sensor system of claim 1, wherein the processor module is configured to generate the corrected output signal using a plurality of analog processing elements or a mix of a plurality of analog and digital processing elements.

17. A high speed sensor system comprising:
a coupler;
a sensor spaced apart from the coupler to form a gap, the sensor comprising a transmitter coil adapted to be energized by a excitation voltage and at least two receiving coils generating a non-sinusoidal output signals, one of the receiver coils generates a generally sine shaped function upon rotation of the coupler and the other of the receiver coils generates a generally cosine shaped function upon rotation of the coupler;
a memory module operable to compensate for the non-sinusoidal output signal caused by the high speed sensor system and a variance in the gap between the coupler and the at least two receiving coils; and
a processor module communicatively coupled to the memory module, the processor module configured to sample the excitation voltage as an analog value and process the non-sinusoidal output signals from both the first and second receiver coils as a raw signal constant, the processor module configured to multiply, by an analog multiplication block, the analog value and the raw signal constant to generate an analog value of a corrected output signal,
wherein the processor module directly inserts the corrected output signal representative of the rotational position of the coupler into the high speed sensor system.

18. The high speed sensor system of claim 17, wherein the excitation voltage that energizes the transmitter coil is dynamic and the raw signals from the non-sinusoidal output signals from both the first and second receiver coils are constant.

* * * * *